June 4, 1963

R. A. KERR ETAL 3,091,806

EXCESSIVE EXTRUSION PRESSURE PREVENTION APPARATUS

Filed Aug. 30, 1961

INVENTORS
ROBERT A. KERR
WALTER L. RICHARDSON
WILLIAM R.H. SPRINGFORD

BY Robert B. Harmon

ATTORNEYS

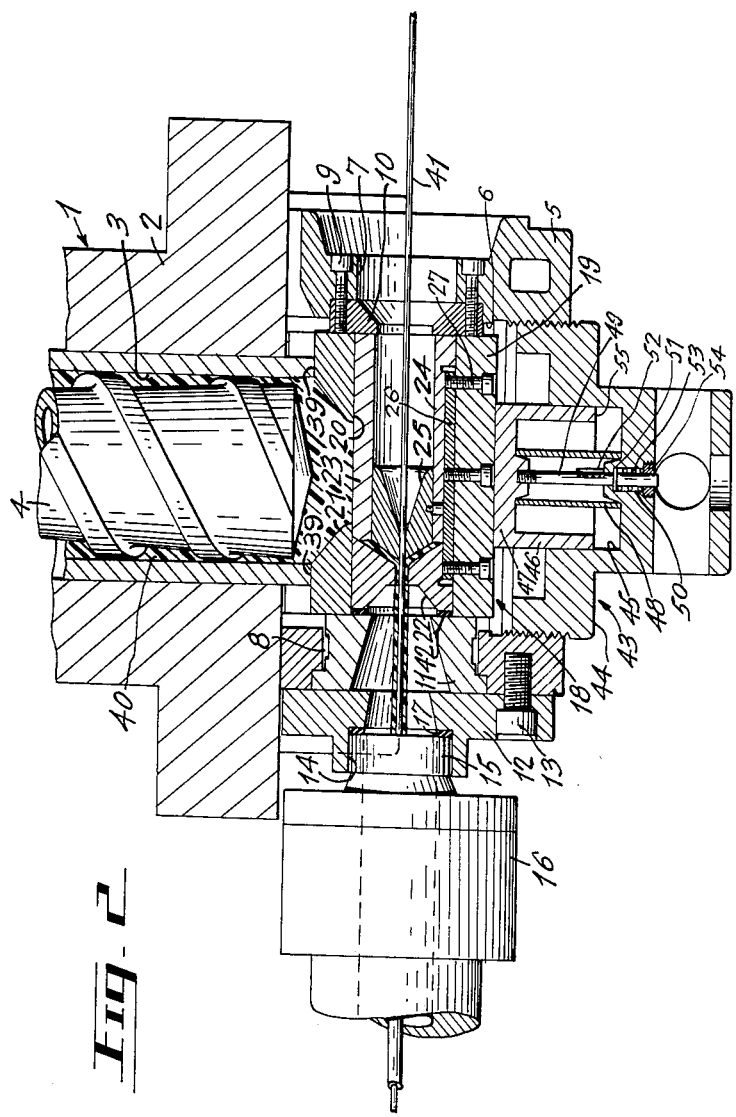

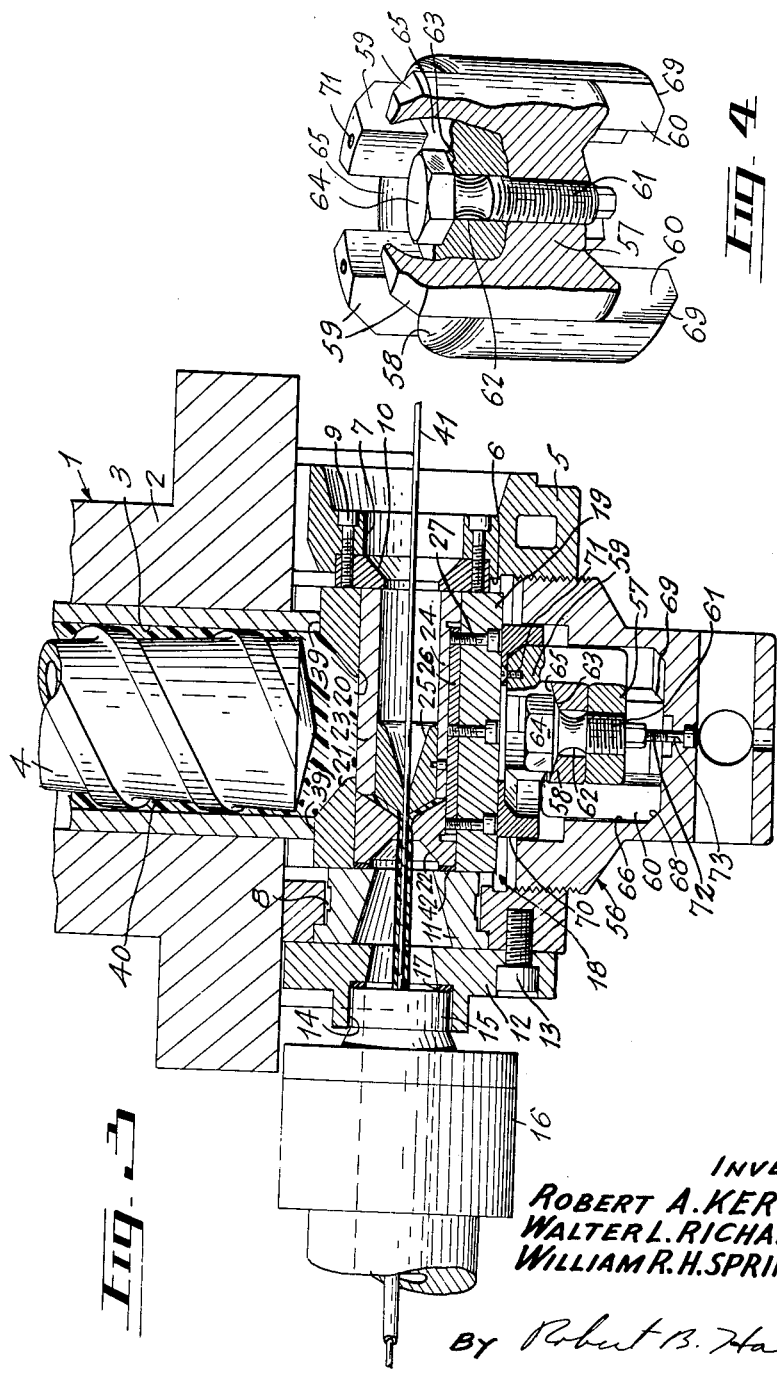

United States Patent Office 3,091,806
                              Patented June 4, 1963

3,091,806
EXCESSIVE EXTRUSION PRESSURE
PREVENTION APPARATUS
Robert A. Kerr, Lachine, Quebec, Walter L. Richardson, Pointe Claire, Quebec, and William R. H. Springford, Montreal, Quebec, Canada, assignors to Northern Electric Company, Limited, Montreal, Quebec, Canada, a corporation of Canada
Filed Aug. 30, 1961, Ser. No. 134,995
5 Claims. (Cl. 18—13)

This invention relates to apparatus for the prevention of excessive pressures in extruding machines and more particularly to the apparatus for preventing excessive extrusion pressures in continuous rubber insulating and vulcanizing machines for electrical wires and cables.

In the manufacture of rubber insulated wires and cables the conductor to be covered is advanced continuously through the extrusion head of an extruding machine. Disposed within a cavity in the extrusion head are extrusion tools comprising a forming die, a core tube and a core tube holder. As the conductor advances through the extrusion head it is centered with respect to the forming die by the core tube and the core tube holder while an extrusion apparatus forces the rubber around the conductor into a continuous insulating layer. From the extrusion head the covered conductor passes into a high pressure steam tube, connected directly to the outlet of the extrusion head, in which the rubber coating is vulcanized.

The purpose of the extrusion apparatus is to receive a charge of the insulating material and, by the application of heat and work, reduce it to a form in which it, when introduced into the extrusion head, can be formed around the conductor as a continuous covering. High extrusion pressures are normal during this working of the material and the extrusion apparatus is constructed accordingly to withstand them. However, the extrusion apparatus is frequently subjected to higher than normal extrusion pressures resulting from material that is not heated sufficiently or material that is overheated and is precured within the extrusion apparatus. In order that the extrusion apparatus be protected from damage resulting from excessively high extrusion pressures, the bolts attaching the extrusion head to the extrusion apparatus are designed to fracture at a limiting pressure, allowing the extrusion head to move slightly away from the extrusion apparatus and relieve the excess pressure. While this means of protecting the extrusion apparatus is sufficient it introduces a definite safety hazard in the above described continuous rubber insulating and vulcanizing machine. In this type of machine, because the vulcanizing tube containing high pressure steam is connected directly to the extrusion head, any movement of the extrusion head resulting from fracture of the extrusion head retaining bolts will tend to open this connection and allow the high pressure steam to escape in the vicinity of the machine operator.

This invention provides a means for relieving excessive extrusion pressures without the attendant hazards to the machine operator as evidenced in the prior art machines. The extrusion tools consisting of the forming die, core tube and core tube holder are mounted in a tool holder, as is common practice, and positioned in the cavity in the extrusion head as a unit. They are normally held in place by a retaining nut which forces them against the outlet of the extrusion apparatus to form a seal and prevent leakage of the insulating material. In this invention, however, a yieldable means is disposed between the extrusion tools and the retaining nut, the yieldable means being designed to yield under a predetermined extrusion pressure limit and allow the extrusion tools to move within the cavity and away from the outlet of the extrusion apparatus. This movement breaks the seal between the extrusion tools and the outlet of the extrusion apparatus and allows the insulating material to escape, thereby relieving the excessive pressure. Because the extrusion tools only are affected the extrusion head remains fixed to the extrusion apparatus and no steam leakage from the vulcanizing tube can occur.

In addition to the important safety feature of the invention a further advantage is realized in that the yieldable devices disclosed are easier and less expensive to replace than the retaining bolts of the prior art machines.

A full understanding of the invention will be obtained from the following detailed description and explanation which refer to the accompanying drawings in which like reference numbers refer to like parts, and in which:

FIG. 2 is a partial section view in plan of a continuous insulating and vulcanizing machine illustrating a second embodiment of the invention;

FIG. 3 is a partial section view in plan of a continuous insulating and vulcanizing machine illustrating a third embodiment of the invention; and FIG. 4 is a perspective view of the yieldable means of the third embodiment.

Figure 1:
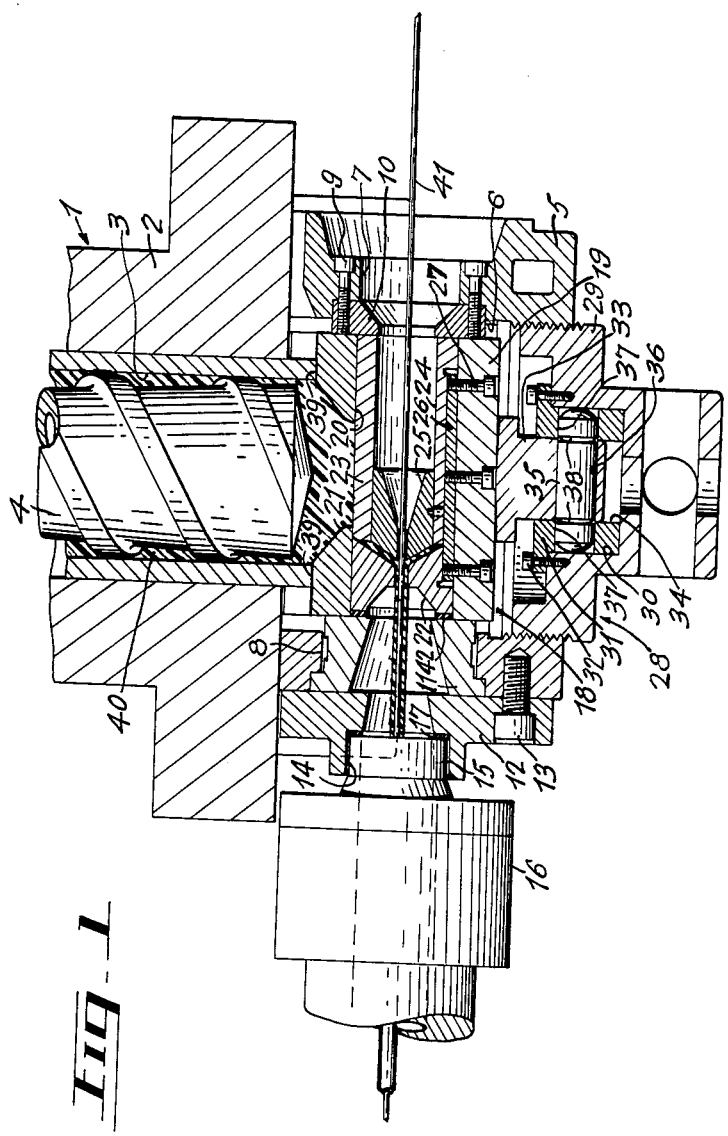
FIG. 1 is a partial section view in plan of a continuous insulating and vulcanizing machine illustrating one embodiment of the invention.

In FIG. 1 is illustrated an extrusion apparatus designated generally as 1 consisting of an extrusion cylinder 2 having a bore 3 therein, in which a stock screw 4 is rotatably positioned. Rigidly attached to the open end of the cylinder 2 by retaining bolts (not shown) is an extrusion head 5 having a cavity 6 therein. The cavity 6 extends completely through the extrusion head 5 in line with the bore 3 of the extrusion cylinder 1. Inlet and outlet openings 7 and 8 to the cavity 6 are provided substantially at right angles to the bore 3 of the extrusion cylinder 1. Positioned in the inlet opening 7 by mounting screws 9 is a backing plate 10. A guide bushing 11 is slidably mounted in the outlet opening 8 and held in place by an adapter ring 12 which is in turn fastened to the extrusion head 5 by mounting screws 13. The adapter ring 12 has an axial bore 14 in which is slidably mounted the spigot 15 of a steam vulcanizing tube 16. Positioned between the end of the spigot 15 and the bottom of the bore 14 is a gasket 17 to prevent leakage of the steam from the vulcanizing tube 16.

The extrusion tools designated generally as 18 comprise a tool holder 19 having a bore 20 therethrough and a tapered opening 21 in one side thereof for connecting the bore 20 with the extrusion cylinder bore 3, a forming die 22 positioned in the outlet end of the bore 20, and a core tube holder 23 positioned in the inlet end thereof. Within an axial bore 24 in the core tube holder 23 and at the outlet end thereof is positioned a core tube 25 in axial alignment with the forming die 22. The core tube holder 23, core tube 25 and forming die 22 are maintained in mutual alignment by an aligning plate 26 rigidly attached to the wall of the bore 20 in the tool holder 19 by screws 27.

The extrusion tools 18 are retained in the cavity 6 of the extension head 5 by means of a retaining plug designated generally as 28. This plug consists of a retaining nut 29 threaded into the extrusion head 5 and having an axial bore 30 therein, a sleeve 31 slidably mounted in the bore 30 and held in place by the screws 32, a piston 33 slidably mounted within an axial bore 34 of the sleeve 31, and a shear pin 35 positioned within a diametrical hole 36 in the piston 33 and extending from either end into radial holes 37—37 in the sleeve 31. At the points where the shear pin 35 leaves the hole 36 and enters the holes 37 it is provided with circumferential grooves 38.

In operation the extrusion tools 18 are placed in the cavity 6 through the threaded opening in the extrusion head 5 and positioned between the backing plate 10 and guide bushing 11. A gasket 42 is placed between the forming die 22 and guide bushing 11 to prevent steam leakage from the vulcanizing tube 16. The assembled retaining plug 28 is threaded into the extrusion head 5 to bring the piston 33 in abutment with the tool holder 19 which is then forced against the end of the cylinder 2 to provide a seal at 39. Insulating material 40 is placed in the bore 3 of the extrusion cylinder 2 and the stock screw 4 is caused to rotate by a driving means (not shown). Rotation of the stock screw works the insulating material 40 and forces it under high pressure through the tapered opening 21 in the tool holder 19, around the core tube holder 23, between the core tube 25 and forming die 22 and around a conductor 41 being advanced through the extrusion head 5 by an advancing means (not shown). After receiving the covering of insulating material 40 the conductor 41 proceeds into the vulcanizing tube 16 where the insulating material is cured.

If for some reason the pressure of the insulating material 40 within the extrusion apparatus 1 and the extrusion head 5 exceeds a specified maximum, the force transmitted through the extrusion tools 18 and piston 33 causes the shear pin 35 to shear off along the circumferential grooves 38. These grooves have been designed according to the material of the shear pin and the maximum extrusion pressure allowable to cause failure of the shear pin 35. This failure allows the piston 33 to slide within the bore 34 of the sleeve 31 under the pressure, permitting movement of the extrusion tools 18 away from the source of pressure which breaks the seal at 39, thus relieving the extrusion pressure.

A second embodiment of the invention is illustrated in FIG. 2. All of the parts are the same as in FIG. 1 and have like reference numbers except for the retaining plug 43. The retaining nut 44 has a bore 45 therein. Slidably mounted within the bore 45 is a cup-shaped member 46 with its bottom 47 abutting the tool holder 19. Positioned between the inside surface of the bottom 47 and the bottom of the bore 45 in the retaining nut 44 is a tubular cylinder 48. The cylinder is designed, according to its material and the maximum allowable extrusion pressure, to yield by crushing under the axial compressive pressure force and allow relief of the pressure in the same manner as the first embodiment of FIG. 1.

The assembly is held together by a rod 49 threaded into the bottom 47 of the member 46 and extending through a stepped bore 50 in the retaining nut 44. A shoulder 51 on the rod 49, through contact with the step of the bore 46, prevents disengagement of the rod 49 from the retaining nut 44. The rod 49 is further retained by a spring 53 and an annular nut 54 positioned in the enlarged portion of the bore 50 acting on the shoulder 51 opposite to the step of the bore 50. The spring 53 is compressible a greater amount than the distance between the lip 55 of the member 46 and the bottom of the bore 45.

The rod 49 provides an added advantage in that when the cylinder fails and the member 46 moves toward the bottom of the bore 45, the rod will extend from the bore 50. This can be used as a visual signal, or may be connected to an alarm system, for immediate indication of failure of the cylinder. A similar rod could also be incorporated with the first embodiment to act solely as a warning device, although usually the sound of the shear pin failing is sufficient warning in itself.

The third embodiment of the invention is illustrated in FIG. 3, the yieldable means being more clearly shown in FIG. 4. As in the case of the second embodiment, most of the parts are the same as the first embodiment with like reference numbers except for the retaining plug 56. In this embodiment the yieldable means comprises two cup-shaped members 57 and 58, each having four portions removed from the lengths of their wall sections, the remaining wall portions 59 of member 57 being adapted to match the spaces between the remaining wall portions 60 of member 58 and vice versa. The members are dovetailed coaxially as shown, with their respective wall portions 59 and 60 extending in substantially opposite directions, and are joined together by a bolt 61 through their adjacent bottom surfaces. The bolt 61 has a reduced diameter at 62 which is designed to yield in tension under excessive extrusion pressures in the extrusion head 5. To ensure alignment of the tension forces on the bolt 61, the shoulder 63 under the head 64 of the bolt 61 is spherically shaped to match a similarly shaped depression 65 in the bottom of the member 58.

The yieldable means is disposed within a bore 66 in the retaining nut 67 and abuts the tool holder 23. The free ends of the wall portions 60 of the member 58 extend to the bottom of the bore 66, which is chamfered around its circumference at 68 to match co-operating chamfers 69 on the wall portions 60 to prevent spreading of these wall portions when they are under load due to the extrusion pressures. Likewise, the wall portions 59 of the member 57 are retained against spreading by a retaining ring 70 attached to the wall portions by screws 71 and bear against the tool holder 23. In this manner any extrusion pressures within the extrusion head 5 cause the extrusion tools 18 to force against the wall portions 59 of the member 57 which in turn puts a tensile load on the bolt 61. This tensile load on the bolt 61 is resisted by the member 58 through its wall portions 60 which are supported by the bottom of the bore 66 in the retaining nut 67. Should extrusion pressures exceed the specified maximum the bolt 61 will fail at its narrow portion 62 and member 57 will slide with respect to member 58 thus permitting movement of the extrusion tools 18 away from the extrusion apparatus 1 and the subsequent relief of the extrusion pressure.

An assembly retaining bolts 72 protrudes through a stepped hole 73 in the retaining nut 67 and threads into the end of the bolt 61. As well as maintaining the assembly during normal installation and removal of the retaining plug 56, the bolts 72 will act on failure of the bolt 61 to provide a visual indication of the failure by extending from the hole 73.

The foregoing description of three embodiments of a yieldable means for preventing excessive extrusion pressures has been directed mainly to continuous rubber insulating and vulcanizing machines. It is obvious, however, that this invention can be applied to other extrusion apparatus such as that employed in the insulating of electrical conductors with plastics. Although in these other cases no steam hazards are present, the yieldable means of this invention provides an inexpensive and easily replaceable means for preventing excessive extrusion pressures.

Other types of extrusion apparatus will differ from that specifically described in this specification. Not all extrusion heads have a threaded opening in line with the bore of the extrusion apparatus and a retaining nut for the threaded opening to hold the extrusion tools in the cavity therein. However, only simple adaption would be required to position the above described yieldable means between the extrusion tools and the wall of the extrusion head cavity opposite to the opening connecting the cavity with the bore of the extrusion apparatus. This adaption, and others, of this invention would become obvious and would fall within the scope of the following claims.

What is claimed is:

1. In an extrusion apparatus, an extruding head having an extrusion passage therein, comprising:
    an extrusion cylinder in which a stock screw is rotated to force forming material into the extrusion passage through a first opening in such passage, the opening extending a predetermined distance outwardly from the extrusion cylinder,
    a holder, in which extrusion tools are contained, disposed within and slidable in the passage in axial relation with the extrusion cylinder, so as to open and close the extended portion of the said opening so as to prevent or permit the flow of the forming material material therethrough respectively, a yieldable means comprising:
- a piston, disposed in a chamber formed in the extruding head directly opposite to the extrusion cylinder, in slidable engagement within the chamber and in axial relation with the extrusion cylinder, the head of the piston supporting the said holder, the piston rod extending into the chamber so as to leave a predetermined space between the bottom of the chamber and the end of the piston rod,
- a shear pin extending traversely to the longitudinal axis of the piston rod through the piston rod, the ends being secured to the walls of the chamber, so disposed as to maintain the said holder to close the said first opening, consistent with a predetermined pressure within the passage and to yield when said pressure exceeds a predetermined limit so as to allow the said holder to drop and allow the forming material to escape through the extended portion of said first opening.

2. An extrusion apparatus as defined in claim 1 having an indicating means actuated by said yieldable means so as to indicate yielding of said yieldable means.

3. An extrusion apparatus as defined in claim 1 comprising:
- a second opening in the side of the head, directly opposite to the said first opening,
- a plug, having a cavity in which the said chamber is contained, inserted in the second opening and removable so that the said extrusion tools can be removed.

4. In an extrusion apparatus, an extruding head having an extrusion passage therein, comprising:
- an extrusion cylinder in which a stock screw is rotated to force forming material into the extrusion passage through a first opening in such passage, the opening extending a predetermined distance outwardly from the extrusion cylinder,
- a holder, in which extrusion tools are contained, disposed within and slidable in the passage in axial relation with the extrusion cylinder, so as to open and close the extended portion of the said opening so as to prevent or permit the flow of forming material therethrough respectively,
- a yieldable means disposed directly opposite the extrusion cylinder and supporting the extrusion tools comprising:
  - a tubular cylinder yieldable when the pressure within the passage exceeds a predetermined amount so as to permit the extrusion tools to recede from the opening to permit the escape of the forming material through the extended portion of the said first opening.

5. In an extrusion apparatus, an extruding head having an extrusion passage therein, comprising:
- an extrusion cylinder in which a stock screw is rotated to force forming material into the extrusion passage through a first opening in such passage, the opening extending a predetermined distance outwardly from the extrusion cylinder,
- a holder, in which extrusion tools are contained, disposed within and slidable in the passage in axial relation with the extrusion cylinder, so as to open and close the extended portion of the said opening so as to prevent or permit the flow of the forming material therethrough respectively,
- a yieldable means comprising:
  - a first and a second cup-like members having a plurality of portions removed from the longitudinal axial lengths of their wall sections, said members axially disposed such that the inside bottom surfaces of said members are adjacent, the wall portions of each of said members extending through the removed wall portions of the other of said members in substantially the opposite directions so as to dove-tail, said members disposed between the extrusion tools and the removable means such that the free ends of the wall portions of the first member contact the extrusion tools and the free ends of the wall portions of the second member contact the removable means, a tension member joining the bottoms of said members and being yieldable under excessive pressure of the material in the passage to permit movement of the extrusion tools away from the first opening.

References Cited in the file of this patent

UNITED STATES PATENTS

| | | |
|---|---|---|
| 1,535,392 | Ashton | Apr. 28, 1925 |
| 2,557,738 | Gliss | June 19, 1951 |
| 2,642,898 | Adcock | June 23, 1953 |
| 2,656,566 | Berggren | Oct. 27, 1953 |
| 2,786,234 | Beyer | Mar. 26, 1957 |
| 2,836,851 | Holt | June 3, 1958 |
| 2,867,004 | Levison et al. | Jan. 6, 1959 |
| 2,179,961 | Schnuck | Nov. 14, 1959 |
| 2,911,676 | Henning | Nov. 10, 1959 |